United States Patent
Perez et al.

(10) Patent No.: US 9,834,713 B2
(45) Date of Patent: Dec. 5, 2017

(54) ORIENTED THERMALLY CONDUCTIVE DIELECTRIC FILM

(71) Applicant: 3M INNOVATIVE PROPERTIES COMPANY, St. Paul, MN (US)

(72) Inventors: Mario A. Perez, Burnsville, MN (US); Mitchell T. Huang, Austin, TX (US); Jeremy M. Higgins, Roseville, MN (US); Clint J. Novotny, Minneapolis, MN (US)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 0 days.

(21) Appl. No.: 15/050,922

(22) Filed: Feb. 23, 2016

(65) Prior Publication Data
US 2017/0240788 A1    Aug. 24, 2017

(51) Int. Cl.
| | | |
|---|---|---|
| B32B 15/09 | (2006.01) | |
| B32B 27/08 | (2006.01) | |
| C09K 5/14 | (2006.01) | |
| B29C 55/00 | (2006.01) | |
| B29K 67/00 | (2006.01) | |
| B29K 505/02 | (2006.01) | |
| B29K 507/02 | (2006.01) | |
| B29K 507/04 | (2006.01) | |
| B29K 509/00 | (2006.01) | |
| B29K 505/08 | (2006.01) | |

(52) U.S. Cl.
CPC ............ C09K 5/14 (2013.01); B29C 55/005 (2013.01); *B29K 2067/003* (2013.01); *B29K 2505/02* (2013.01); *B29K 2505/08* (2013.01); *B29K 2507/02* (2013.01); *B29K 2507/04* (2013.01); *B29K 2509/00* (2013.01)

(58) Field of Classification Search
CPC ................................. B32B 15/09; B32B 27/08
See application file for complete search history.

(56) References Cited

U.S. PATENT DOCUMENTS

| | | | |
|---|---|---|---|
| 4,801,640 | A | 1/1989 | Dallmann et al. |
| 5,514,462 | A | 5/1996 | Endo et al. |
| 6,054,224 | A | 4/2000 | Nagai et al. |
| 6,203,921 | B1 | 3/2001 | Carter et al. |
| 7,074,463 | B2 | 7/2006 | Jones et al. |
| 7,534,487 | B2 * | 5/2009 | Klein ............ B32B 27/36 264/173.16 |
| 8,465,670 | B2 | 6/2013 | Kondo et al. |
| 8,605,213 | B2 | 12/2013 | Park |
| 2007/0205706 | A1 | 9/2007 | Yamada |
| 2009/0255571 | A1 | 10/2009 | Xia et al. |
| 2010/0242958 | A1 | 9/2010 | Jinks et al. |
| 2015/0080495 | A1 | 3/2015 | Heikkila |

FOREIGN PATENT DOCUMENTS

| | | |
|---|---|---|
| JP | 2017066391 | 4/2017 |
| KR | 2012119296 | 10/2012 |
| KR | 20120119296 | 10/2012 |
| KR | 10-1266264 | 6/2013 |
| WO | WO 2015/006697 | 1/2015 |
| WO | WO 2015/045979 | 4/2015 |
| WO | WO 2016/178120 A1 | 11/2016 |

OTHER PUBLICATIONS

Breil, Chapter 11, "Oriented film technology," *Multilayer Flexible Packaging*, 2009 Elsevier Inc., pp. 119-136.
Breil, Chapter 16, "Multilayer oriented films," *Multilayer Flexible Packaging*, 2009 Elsevier Inc., pp. 232-237.
Product Data Sheet, "LA-960 Laser Particle Size Analyzer", Horiba Scientific, copyright 1996-2015. Retrieved online Dec. 24, 2015, at <http://www.horiba.com/scientific/products/particle-characterization/particle-size-analysis/details/la-960-laser-particle-size-analyzer-20235/>, 4 pages.
Rao et al., "The relationship between microstructure and toughness of biaxially oriented semicrystalline polyester films," *Polymer*, 2009, 49:2507-2514.

* cited by examiner

*Primary Examiner* — Robert Harlan

(57) ABSTRACT

An oriented film includes an orientated semi-aromatic polyester layer and a thermally conductive filler dispersed in the orientated semi-aromatic polyester layer. The thermally conductive filler is at least 20% wt. of the oriented film.

16 Claims, No Drawings

ORIENTED THERMALLY CONDUCTIVE DIELECTRIC FILM

BACKGROUND

Heat is an undesirable by-product in the operation of electrical devices, such as, motors, generators, and transformers. Elevated operating temperatures can reduce device reliability and lifetime. The dissipation of heat also imposes constraints on device design and hinder the ability to achieve higher power density devices. Electrical insulation materials typically have low thermal conductivity, which can limit heat dissipation in electrical devices.

Polyethylene terephthalate films are widely used as electrical insulation within motors, generators, transformers, and many other applications. For higher performance applications, where higher temperature and/or higher chemical resistance are needed, polyimide films are used.

SUMMARY

The present disclosure relates to oriented thermally conductive dielectric films. In particular, the dielectric films are oriented thermoplastic films with thermally conductive fillers.

In one aspect, an oriented film includes an orientated semi-aromatic polyester layer and a thermally conductive filler dispersed in the orientated semi-aromatic polyester layer. The thermally conductive filler is at least 20% wt. of the oriented film.

In another aspect, a thermally conductive thermoplastic film includes a thermoplastic layer; and a thermally conductive filler dispersed in the thermoplastic layer. The thermally conductive filler is hydrophobic and forms at least 20% wt. of the oriented film.

In another aspect, a method includes dispersing a thermally conductive filler in a thermoplastic material to form a filled thermoplastic material and forming a filled thermoplastic layer from the filled thermoplastic material. Then the filled thermoplastic layer is stretched to form an oriented filled thermoplastic film. The oriented filled thermoplastic film has a thermal conductivity greater than 0.25 W/(m K).

These and various other features and advantages will be apparent from a reading of the following detailed description.

DETAILED DESCRIPTION

In the following detailed description, reference is made to the accompanying drawings that form a part hereof, and in which are shown by way of illustration several specific embodiments. It is to be understood that other embodiments are contemplated and may be made without departing from the scope or spirit of the present disclosure. The following detailed description, therefore, is not to be taken in a limiting sense.

All scientific and technical terms used herein have meanings commonly used in the art unless otherwise specified. The definitions provided herein are to facilitate understanding of certain terms used frequently herein and are not meant to limit the scope of the present disclosure.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise.

As used in this specification and the appended claims, the term "or" is generally employed in its sense including "and/or" unless the content clearly dictates otherwise.

As used herein, "have", "having", "include", "including", "comprise", "comprising" or the like are used in their open ended sense, and generally mean "including, but not limited to". It will be understood that "consisting essentially of", "consisting of", and the like are subsumed in "comprising," and the like.

"Polymer" refers to, unless otherwise indicated, polymers and copolymers (i.e., polymers formed from two or more monomers or comonomers, including terpolymers, for example), as well as copolymers or polymers that can be formed in a miscible blend by, for example, coextrusion or reaction, including transesterification, for example. Block, random, graft, and alternating polymers are included, unless indicated otherwise.

"Polyester" refers to a polymer that contains an ester functional group in the main polymer chain. Copolyesters are included in the term "polyester".

"Semi-aromatic" polymer refers to a polymer that is not fully aromatic and contains aliphatic segments. Semi-aromatic polymers referred to herein are not capable of forming or exhibiting a liquid crystal phase.

The present disclosure relates to oriented thermally conductive dielectric films. In particular the films are oriented thermoplastic film with thermally conductive fillers. The oriented thermoplastic film may be polyesters or polyester copolymers that may be semi-aromatic and contain at least 20% wt. thermally conductive fillers. The thermally conductive fillers may be hydrophobic. The compositions described herein are unique because molecular orientation is imparted by stretching to enhance mechanical properties while minimally affecting thermal and electrical properties. The oriented high thermal conductivity films and sheets described herein may be formed via biaxial (sequential or simultaneous) or uniaxial stretching. Oriented films described herein have thermal conductivities (through the plane) ranging from 0.25 to 0.85 W/(m K) with dielectric strengths ranging from 20 to 120 KV/mm. These films can be utilized in many areas of thermal management that lead to higher equipment efficiencies and lower operating temperatures with potentially higher power delivery per unit volume. While the present disclosure is not so limited, an appreciation of various aspects of the disclosure will be gained through a discussion of the examples provided below.

The oriented thermoplastic film described herein can be formed of any useful thermoplastic polymer material that can be molecularly orientated via stretching. The oriented thermoplastic film can be formed of polyphenylsulphone, polypropylene, polyester or fluoropolymers, for example. In many embodiments the oriented thermoplastic film is formed of a polyester such as polyethylene terephthalate (PET) or polyethylene naphthalate (PEN) or copolymers thereof.

The polyester polymeric materials may be made by reactions of terephthalate dicarboxylic acid (or ester) with ethylene glycol. In some embodiments, the polyester is generally made by reactions of terephthalate dicarboxylic acid (or ester) with ethylene glycol and at least one additional comonomer that contributes branched or cyclic C2-C10 alkyl units.

Suitable terephthalate carboxylate monomer molecules for use in forming the terephthalate subunits of the polyester include terephthalate carboxylate monomers that have two or more carboxylic acid or ester functional groups. The terephthalate carboxylate monomer may include terephthalate dicarboxylic acid such as 2,6-terephthalate dicarboxylic acid monomer and isomers thereof.

The polyester layer or film may include a branched or cyclic C2-C10 alkyl unit that is derived from a branched or cyclic C2-C10 alkyl glycol such as neopentyl glycol, cyclohexanedimethanol, and mixtures thereof. The branched or cyclic C2-C10 alkyl unit may be present in the polyester layer or film in an amount less than 2 mol %, or less than 1.5 mol %, or less than 1 mol %, based on total mol % of ethylene and branched or cyclic C2-C10 alkyl units used to from the polyester material.

The polyester layer or film may be referred to as "semi-aromatic" and contain non-aromatic moieties or segments or aliphatic segments. In many embodiments the semi-aromatic polyester layer includes at least 5 mol % aliphatic segments or at least 10 mol % aliphatic segments or at least 20 mol % aliphatic segments or at least 30 mol % aliphatic segments. The polyester layer or film described herein may not exhibit or form a liquid crystal phase.

An oriented film may include an orientated semi-aromatic polyester layer and a thermally conductive filler dispersed in the orientated semi-aromatic polyester layer. The thermally conductive filler includes at least 20% wt. of the oriented film.

In some embodiments the thermally conductive filler includes at least 10% wt., or at least 20% wt., or at least 25% wt., or at least 30% wt., or at least 35% wt., or at least 40% wt., or at least 50% wt. of the oriented film. The oriented film may include the thermally conductive filler in a range from 10% wt. to 60% wt., or from 20% wt. to 50% wt.

The thermally conductive filler may be any useful filler material that has a thermal conductivity value that is greater than a thermal conductivity value of the polymer it is dispersed within. In many embodiments the thermally conductive filler has a thermal conductivity value that is greater than 1 W/(m K) or greater than 1.5 W/(m K) or greater than 2 W/(m K) or greater than 5 W/(m K) or greater than 10 W/(m K).

Exemplary thermally conductive filler include, for example, metal oxides, metal nitrides, and metal carbides. In many embodiments the thermally conductive filler include, for example, boron nitride, aluminum nitride, aluminum oxide, beryllium oxide, magnesium oxide, thorium oxide, zinc oxide, silicon nitride, silicon carbide, silicon oxide, diamond, copper, silver, and graphite and mixtures thereof.

The thermally conductive filler can have any useful particle size. In many embodiments the thermally conductive filler has a size in a range from 1 to 100 micrometers or from 1 to 20 micrometers. At least 90% of the thermally conductive filler particles have a particles size in a range from 1 to 100 micrometers or from 1 to 20 micrometers. At least 95% of the thermally conductive filler particles have a particles size in a range from 1 to 100 micrometers or from 1 to 20 micrometers. At least 99% of the thermally conductive filler particles have a particles size in a range from 1 to 100 micrometers or from 1 to 20 micrometers. One method to determine particle size is described in ASTM Standard D4464 and utilizes laser diffraction (laser scattering) on a Horiba LA 960 particle size analyzer.

The thermally conductive filler increases the thermal conductivity value of the thermoplastic layer it is incorporated into. The unfilled thermoplastic layer may have a through plane thermal conductivity value of 0.25 W/(m K) or less or 0.2 W/(m K) or less or 0.1 W/(m K) or less. The filled (with the thermally conductive filler) thermoplastic layer has a thermal conductivity value of 0.25 W/(m K) or greater, or 0.3 W/(m K) or greater, or 0.4 W/(m K) or greater, or 0.5 W/(m K) or greater, or 0.6 W/(m K) or greater. In many embodiments the filled (with the thermally conductive filler) thermoplastic layer has a thermal conductivity value in a range from 0.25 to 0.85 W/(m K) or from 0.35 to 0.8 W/(m K) or from 0.4 to 0.8 W/(m K). The thermally conductive filler may increase the thermal conductivity value of the thermoplastic layer by at least 0.05 W/(m K) or at least 0.1 W/(m K) or at least 0.2 W/(m K) or at least 0.4 W/(m K) or at least 0.6 W/(m K) or at least 0.8 W/(m K).

The oriented thermoplastic film described herein may be referred to as a "dielectric" film. In many embodiments the oriented thermoplastic film described herein has a dielectric or breakdown strength of at least 20 kV/mm or at least 30 kV/mm or at least 50 kV/mm or at least 75 kV/mm or at least 90 kV/mm.

In many embodiments, the thermally conductive thermoplastic film includes a thermoplastic layer and a thermally conductive filler dispersed in the thermoplastic layer. The thermally conductive filler is hydrophobic and forms at least 10% wt. or at least 20% wt. of the oriented film. Any of the thermally conductive filler can be rendered hydrophobic via surface treatment known in the art. In some cases, the thermally conductive filler described above are hydrophobic.

The term "hydrophobic" refers to a surface exhibiting water repelling properties. One useful way to determine this is to measure the water contact angle. The "water contact angle" is the angle, conventionally measured through the liquid, where a liquid/vapour interface meets a solid surface. It quantifies the wettability of a solid surface by a liquid via the Young equation.

The hydrophobic thermally conductive filler has a water contact angle of at least about 90 degrees, at least about 95 degrees, at least about 100 degrees, at least about 110 degrees, at least about 120 degrees, at least about 130 degrees at least about 140 degrees, at least about 150 degrees, at least about 160 degrees, or at least about 170 degrees. Hydrophobicity is determined by utilizing the ASTM D7334-08 "Standard Practices for Surface Wettability of Coatings, Substrates and Pigments by Advancing Contact Angle Measurement" and the result is presented as an interfacial contact angle and reported in "degrees" and can range from near zero degrees to near 180 degrees. Where no contact angle is specified along with the term hydrophobic, the water contact angle is at least 90 degrees.

The hydrophobic thermally conductive filler and thermoplastic materials described herein may be generally considered as incompatible materials. It is unexpected that these materials would form a useful oriented film as illustrated in the examples below.

The thermally conductive filler may be surface modified to include a surface treatment agent attached to the surface of the particles forming the thermally conductive filler. The amount of surface modifier may be dependent upon several factors such particle size, particle type, modifier molecular weight, and modifier type. In general may be preferred that approximately a monolayer of modifier is attached to the surface of the particle. The attachment procedure or reaction conditions required also depend on the surface modifier used. For silanes it is preferred to surface treat at elevated temperatures under acidic or basic conditions for from 1-24 hr approximately. Representative embodiments of surface treatment agents include, for example, isooctyl trimethoxysilane, N-(3-triethoxysilylpropyl) methoxyethoxyethoxyethyl carbamate (PEG3TES), Silquest A1230, N-(3-triethoxysilylpropyl) methoxyethoxyethoxyethyl carbamate (PEG2TES), 3-(methacryloyloxy)propyltrimethoxysilane, 3-acryloxypropyltrimethoxysilane, 3-(methacryloyloxy) propyltriethoxysilane, 3-(methacryloyloxy) propylmethyldimethoxysilane, 3-(acryloyloxypropyl)methyldimethoxysilane, 3-(methacryloyloxy)propyldimethylethoxysilane, 3-(methacryloyloxy) propyldimethylethoxysilane, vinyldimethylethoxysilane, phenyltrimethoxysilane, n-octyltrimethoxysilane, dodecyltrimethoxysilane, octadecyltrimethoxysilane, propyltrimethoxysilane, hexyltrimethoxysilane, vinylmethyldiacetoxysilane, vinylmethyldiethoxysilane, vinyltriacetoxysilane, vinyltriethoxysilane, vinyltriisopropoxysilane, vinyltrimethoxysilane, vinyltriphenoxysilane, vinyltri-t-butoxysilane, vinyltris-isobutoxysilane, vinyltriisopropenoxysilane, vinyltris (2-methoxyethoxy)silane, styrylethyltrimethoxysilane, mercaptopropyltrimethoxysilane, 3-glycidoxypropyltrimethoxysilane, methyltrimethoxysilane, methyltriethoxysilane and mixtures thereof.

The thermally conductive and oriented thermoplastic film can be formed by dispersing a thermally conductive filler in a thermoplastic material to form a filled thermoplastic material and forming a filled thermoplastic layer from the filled thermoplastic material. Then the method includes stretching the filled thermoplastic layer to form an oriented filled thermoplastic film, the oriented filled thermoplastic film having a thermal conductivity greater than 0.25 W/(m K) or greater than 0.4 W/(m K). The stretching step biaxially orients the filled thermoplastic layer to form a biaxially oriented filled thermoplastic film. In some embodiments, the stretching step uniaxially orients the filled thermoplastic layer to form a uniaxially oriented filled thermoplastic film.

The thermally conductive and oriented thermoplastic film can be stretched in one or orthogonal directions in any useful amount. In many embodiments the thermally conductive and oriented thermoplastic film can be stretched to double (2×2) or triple (3×3) a length and/or width of the original cast film or any combination thereof such as a 2×3, for example.

Even though the thermally conductive film is stretched to orient the film, voids in the final film are not present. Any voids that may be created during the stretching or orienting process can be filled be removed by heat treating. It is surprising that these thermally conductive film The final thickness of the thermally conductive and oriented thermoplastic film can be any useful value. In many embodiments, final thickness of the thermally conductive and oriented thermoplastic film is in a range from 25 to 5000 micrometers, or from 50 to 3000 micrometers or from 50 to 400 micrometers or from 125 to 200 micrometers.

The thermally conductive and oriented thermoplastic film can be adhered to a non-woven fabric or material. The thermally conductive and oriented thermoplastic film can be adhered to a non-woven fabric or material with an adhesive material. The thermally conductive and oriented thermoplastic film and film articles described herein can be incorporated into motor slot insulation and dry type transformer insulation. The thermally conductive and oriented thermo-plastic film may form a backing of a tape with the addition of an adhesive layer disposed on the thermally conductive and oriented thermoplastic film. The additional adhesive layer may be any useful adhesive such as a pressure sensitive adhesive.

Objects and advantages of this disclosure are further illustrated by the following examples, but the particular materials and amounts thereof recited in these examples, as well as other conditions and details, should not be construed to unduly limit this disclosure.

EXAMPLES

All parts, percentages, ratios, etc. in the examples are by weight, unless noted otherwise. Solvents and other reagents used were obtained from Sigma-Aldrich Corp., St. Louis, Mo. unless specified differently.

Procedure for Making Cast Sheets:

All cast sheets were made with an 18 mm twin screw extruder made by LEISTRITZ EXTRUSIONSTECHINK GMBH, Nuremberg, Germany and instrumented by Haake Inc (now ThermoScientific Inc.) and sold as a Haake Polylab Microl8 System. Screw speed was held at 350 RPM. Extrusion rates ranged from 40 to 70 grams per minute. All thermoplastics in pellet form were fed into the twin screw with a K-tron feeder model KCL24/KQX4 made by Ktron America, Pitman, N.J. Fillers were fed with a Techweigh volumetric feeder made by Technetic Industries, St. Paul, Minn. A 4 inch coat-hanger die was utilized for this purpose. Final sheet thicknesses in the range of 0.5 to 0.8 mm were obtained.

Procedure for Batch Stretching Cast Sheets:

Squares of 58×58 mm were cut from the original cast sheets. The squares were loaded and stretched using an Accupull biaxial film stretcher made by Inventure Laboratories Inc., Knoxville, Tenn. A temperature of 100 C was set in all zones of the machine unless mentioned otherwise. Films were stretched at speeds ranging from 2-25 mm/min. A preheat of 30 seconds was chosen. The post heat was varied from 30 to 90 seconds. During the post heat the film is clamped at the maximum stretch reached during the cycle.

Tests

Thermal tests: thermal conductivity. Thermal conductivity was calculated from thermal diffusivity, heat capacity, and density measurements according the formula:

$$k = \alpha \cdot c_p \cdot \rho$$

where k is the thermal conductivity in W/(m K), $\alpha$ is the thermal diffusivity in $mm^2/s$, $c_p$ is the specific heat capacity in J/K-g, and $\rho$ is the density in $g/cm^3$. The sample thermal diffusivity was measured using a Netzsch LFA 467 "Hyper-Flash" directly and relative to standard, respectively, according to ASTM E1461-13. Sample density was measured using a Micromeritics AccuPyc 1330 Pycnometer, while the specific heat capacity was measured using a TA Instruments Q2000 Differential Scanning calorimeter with Sapphire as a method standard.

Electrical tests: dielectric strength. The dielectric breakdown strength measurements were performed according to ASTM D149-97a (Reapproved 2004) with the Phenix Technologies Model 6TC4100-10/50-2/D149 that is specifically designed for testing in the 1-50 kV, 60 Hz (higher voltage) breakdown range. Each measurement was performed while the sample was immersed in the fluid indicated. The average breakdown strength is based on an average of measurements up to 10 or more samples. For this experiment we utilized, as is typical, a frequency of 60 Hz and a ramp rate of 500 volts per second.

Tensile Modulus: The tensile modulus tests were conducted on an Instron Universal Testing machine (Norwood, Mass.) using a 500 Newton load cell. The cross head speed was 2 inches per minute as prescribed by ASTM D638-08.

Materials

3M BN—Boron nitride cooling filler platelets 0075. Average particle size 7.5 microns.

3M ESK Ceramics GmbH & Co. A 3M Company. Kempten, Germany.

STARMAG MgO—Magnesium oxide STARMAG PSF-WR. Average particle size 1 micron. Konoshima Chemical Co. Ltd. Osaka, Japan.

FUS-SIL Silica—Silica, FUS-SIL 20 Standard. Average particle size 12 microns. Ceradyne Inc. A 3M Company. Midway, Tenn.

MAGCHEM10—Magnesium oxide. Average particle size 9 microns. Martin Marietta Magnesia Specialties, LLC. Baltimore, Md.

MgO SMO-1—Magnesium oxide SMO-1. Average particle size of two micrometers. Sakai Chemical Industry Co. Ltd. Fukushima, Japan.

PET—Polyethyleneterephthalate Tairllin N404. Nan Ya Plastics Corp. America. Lake City, N.C.

PET-PETg—Polyethyleneterephthalate copolymer. Eastar GN 071. Eastman Chemical Co. Kingsport, Tenn.

Sample Preparation

Samples were prepared and tested using the appropriate materials and procedures listed above and noted in Table 1 for each sample. The final 3 samples listed in Table 1 did not contain fillers.

Results

The results Table 1 below illustrate, for example, that:

1) Thermal conductivity (through plane) increases with the addition of thermally conductive fillers for unstretched and stretched samples.

2) Molecular orientation of the matrix polymer does not necessarily cause a decrease in thermal conductivity and in some cases increases in thermal conductivity are observed.

3) For samples containing anisotropic (acicular or flake-like) particles like boron nitride, an increase in in-plane particle alignment with stretching causes a decrease in out of plane thermal conductivity which implies increases in in-plane thermal conductivity.

4) Surface treatment may be important as evidenced by thermal conductivity and dielectric strength improvement by the use of STARMAG MgO versus untreated particles of similar type like MAGCHEM 10 and SMO-1. Other surface treatments with similar effects like silanes, fatty acids and suitable oils may also provide the same effect.

5) Post heat soak cycles promote increases in thermal conductivity and provide benefit to dielectric strength as polymer molecular movement upon recrystallization or phase and interface rearrangement take place.

6) Combining fillers with differing geometries may provide synergy to increase thermal conductivity.

7) A certain degree of stiffness (Young's Modulus) on a flexible film may aid during insertion of insulation while a device is being manufactured, but the film is still flexible enough to bend around corners for other uses.

8) One of the implications of this invention, a thermally conductive oriented film, is to minimize the creation of voids or cavities in the film. The inorganic particles used herein are not placed in the film for the purpose of forming cavities, voiding or microvoiding upon stretching. Post heating has been utilized as part of the processing cycle to maximize void collapse and healing of similar defects if they were to have been formed during prior processing steps. Thus the final thermally conductive oriented film have minimal voids within the film.

TABLE 1

Percent by weight of thermally conductive particle and derived properties.

| Sample | Stretching Conditions | Thermal Conductivity (W/m K) | Breakdown Strength (kV/mm) | Tensile Modulus (psi) |
|---|---|---|---|---|
| 29% STARMAG MgO in PET | Unstretched | 0.46 | 30 | Not Measured |
| 29% STARMAG MgO in PET | Stretched: 2 × 2, 30 s post heat | 0.41 | 90 | 369,500 |
| 29% STARMAG MgO in PET | Stretched: 2 × 2, 90 s post heat | 0.42 | 94 | 292,000 |
| 30% STARMAG MgO in PET-PETg (80-20) | Unstretched | 0.47 | 28 | Not Measured |
| 30% STARMAG MgO in PET-PETg (80-20) | Stretched: 2 × 2, 30 s post heat | 0.35 | 95 | 396,200 |
| 30% STARMAG MgO in PET-PETg (80-20) | Stretched: 3 × 3, 30 s post heat | 0.41 | 120 | 437,000 |
| 56% STARMAG MgO in PET-PETg (80-20) | Unstretched | 0.74 | Not Measured | Not Measured |
| 56% STARMAG MgO in PET-PETg (80-20) | Stretched: 2 × 2, 30 s post heat | 0.82 | 52 | 371,000 |
| 50% MAGCHEM10 MgO in PET | Unstretched | 0.30 | Not Measured | Not Measured |
| 50% MAGCHEM10 MgO in PET | Stretched: 2 × 2, 30 s post heat | 0.67 | 21 | 303,600 |
| 43% MgO SMO-1 in PET-PETg 80-20 | Unstretched | 0.52 | Not Measured | Not Measured |
| 43% MgO SMO-1 in PET-PETg 80-20 | Stretched: 2 × 2, 30 s post heat | 0.22 | 78 | 228,100 |
| 43% MgO SMO-1 in PET-PETg 80-20 | Stretched: 3 × 3, 30 s post heat | 0.16 | 99 | 243,500 |
| 29% FUS-SIL Silica in PET-PETg 80-20 | Unstretched | 0.35 | 32 | Not Measured |
| 29% FUS-SIL Silica in PET-PETg 80-20 | Stretched: 2 × 2, 30 s post heat | 0.49 | 64 | 379,300 |
| 29% FUS-SIL Silica in PET-PETg 80-20 | Stretched: 3 × 3, 30 s post heat | 0.25 | 51 | 240,000 |

TABLE 1-continued

Percent by weight of thermally conductive particle and derived properties.

| Sample | Stretching Conditions | Thermal Conductivity (W/m K) | Breakdown Strength (kV/mm) | Tensile Modulus (psi) |
|---|---|---|---|---|
| 40% FUS-SIL Silica in PET, pinned | Unstretched | 0.45 | Not Measured | Not Measured |
| 40% FUS-SIL Silica in PET, pinned | Stretched: 2 × 2, 30 s post heat | 0.60 | 49 | 229,300 |
| 20% 3M BN in PET | Unstretched | 0.39 | Not Measured | Not Measured |
| 20% 3M BN in PET | Stretched: 2 × 2, 30 s post heat | 0.26 | 93 | 388,600 |
| PET (no filler) | Unstretched | 0.19 | Not Measured | Not Measured |
| PET (no filler) | Stretched: 3 × 3, no post heat | 0.21 | 260 | 284,400 |
| PET-PETg (80-20 blend, no filler) | Stretched: 2 × 2, 30 s post heat | 0.21 | 82 | 279,300 |

Thus, embodiments of ORIENTED THERMALLY CONDUCTIVE DIELECTRIC FILM are disclosed.

All references and publications cited herein are expressly incorporated herein by reference in their entirety into this disclosure, except to the extent they may directly contradict this disclosure. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof. The disclosed embodiments are presented for purposes of illustration and not limitation.

What is claimed is:

1. An oriented film comprising:
   an orientated semi-aromatic dielectric polyester layer; and
   a thermally conductive filler dispersed in the orientated semi-aromatic dielectric polyester layer, the thermally conductive filler comprising at least 20% wt. of the oriented film.

2. The film according to claim 1, wherein the orientated semi-aromatic polyester layer comprises aliphatic segments.

3. The film according to claim 1, wherein the orientated semi-aromatic polyester layer comprises at least 30 mol % aliphatic segments.

4. The film according to claim 1, wherein the oriented film has a thermal conductivity value of 0.25 W/(m K) or greater.

5. The film according to claim 1, wherein the orientated polyester layer comprises PET or PEN.

6. The film according to claim 1, wherein the orientated polyester layer comprises biaxially orientated polyethylene terephthalate.

7. The film according to claim 1, wherein the thermally conductive filler has a diameter in a range from 1 to 100 micrometers.

8. The film according to claim 1, wherein the biaxially orientated polyester layer has breakdown strength of at least 30 kV/mm.

9. The film according to claim 1, wherein polyester material forming the polyester layer does not exhibit a liquid crystal phase.

10. A thermally conductive thermoplastic film comprising:
    a dielectric thermoplastic layer; and
    a thermally conductive filler dispersed in the dielectric thermoplastic layer, the thermally conductive filler being hydrophobic and comprising at least 20% wt. of the oriented film.

11. The film according to claim 10, wherein the thermally conductive filler has a water contact angle greater than 90 degrees.

12. The film according to claim 10, wherein the oriented film has a thermal conductivity value of 0.25 W/(m K) or greater.

13. The film according to claim 10, wherein the oriented film is biaxially oriented.

14. The film according to claim 10, wherein the thermoplastic layer comprises oriented polyester.

15. The film according to claim 10, wherein the thermoplastic layer comprises oriented polyethylene terephthalate.

16. The film according to claim 1, wherein the thermally conductive filler comprises boron nitride, aluminum nitride, aluminum oxide, magnesium oxide, silicon carbide, graphite, zinc oxide or silica.

* * * * *